United States Patent
Wakizaka

(10) Patent No.: US 8,861,631 B2
(45) Date of Patent: Oct. 14, 2014

(54) RECEIVER APPARATUS, RECEIVING METHOD, AND PROGRAM

(75) Inventor: Yoshiki Wakizaka, Tokyo (JP)

(73) Assignees: NEC Corporation, Tokyo (JP); NTT DoCoMo, Inc., Tokyo (JP)

( * ) Notice: Subject to any disclaimer, the term of this patent is extended or adjusted under 35 U.S.C. 154(b) by 76 days.

(21) Appl. No.: 13/510,215

(22) PCT Filed: Nov. 18, 2010

(86) PCT No.: PCT/JP2010/071071
§ 371 (c)(1),
(2), (4) Date: May 16, 2012

(87) PCT Pub. No.: WO2011/062293
PCT Pub. Date: May 26, 2011

(65) Prior Publication Data
US 2012/0224662 A1 Sep. 6, 2012

(30) Foreign Application Priority Data
Nov. 19, 2009 (JP) .................................. 2009-264256

(51) Int. Cl.
*H04B 7/02* (2006.01)
*H04L 1/02* (2006.01)
*H04L 25/02* (2006.01)
*H04L 5/00* (2006.01)

(52) U.S. Cl.
CPC ........ *H04L 25/0204* (2013.01); *H04L 25/0232* (2013.01); *H04L 5/0023* (2013.01); *H04L 5/0007* (2013.01)
USPC ....................................................... 375/267

(58) Field of Classification Search
USPC ....................................................... 375/267
See application file for complete search history.

(56) References Cited

U.S. PATENT DOCUMENTS 8,462,611 B2  6/2013 Ma et al.
2009/0262844 A1 * 10/2009 Honta ........................... 375/260

FOREIGN PATENT DOCUMENTS

| CN | 1951050 | 4/2007 |
| CN | 101083644 | 12/2007 |
| CN | 101291308 | 12/2008 |
| EP | 2 111 004 | 10/2009 |
| JP | 2007-089167 | 4/2007 |

(Continued)

OTHER PUBLICATIONS

International Search Report, PCT/JP2010/071071, Dec. 21, 2010.

(Continued)

*Primary Examiner* — Chieh Fan
*Assistant Examiner* — Tanmay Shah
(74) *Attorney, Agent, or Firm* — Young & Thompson

(57) ABSTRACT

An interpolation method selection processing section 41 derives, from a ZF output signal, an error in a frequency direction and an error in a time direction concerning two transmit antennas (TxAnt#0#1) used in two antenna transmission, respectively, and determines if the error in the frequency direction is smaller than the error in the time direction. In case the determination indicates that the error in the frequency direction is smaller than the error in the time direction concerning the two transmit antennas (TxAnt#0#1), a frequency interpolation processing section 43 interpolates the ZF output signal in the frequency direction and produces a provisional estimate. If it is determined that the error in the frequency direction is not smaller than the error in the time direction concerning the two transmit antennas (TxAnt#0#1), a time interpolation processing section 42 interpolates the ZF output signal in the time direction and generates a provisional estimate.

6 Claims, 8 Drawing Sheets

(56) References Cited

FOREIGN PATENT DOCUMENTS

| JP | 2008-135823 | 6/2008 |
|---|---|---|
| JP | 2010-118783 | 5/2010 |
| JP | 2010-171556 | 8/2010 |

OTHER PUBLICATIONS

LG Electronics, Performance evaluation of DL reference signal on control channel, 3GPP TSG RAN WG1 #48 R1-070909, Feb. 12, 2007, pp. 1-8.

LG Electronics, Reference-signal structure for E-UTRA Downlink MIMO, 3GPP TSG RAN WG1 #47 R1-063536, Nov. 6, 2006, pp. 1-12.

Nortel, Proposal for the Downlink MIMO Pilots for E-UTRA, 3GPP TSG RAN WG1 LTE ad hoc R1-060146, Jan. 23, 2006, pp. 1-17.

Motorola, Four Transmit Antenna Downlink RS Formats for EUTRA, 3GPP TSG RAN WG1 #47bis R1-070147, Jan. 15, 2007, pp. 1-6.

3GPP TS 36.211 V9.1.0 (Mar. 2010), 3rd Generation Partnership Project; Technical Specification Group Radio Access Network; Evolved Universal Terrestrial Radio Access (E-UTRA); Physical Channels and Modulation (Release 9) pp. 1-85.

Chinese Official Action—201080052702.4—Apr. 21, 2014.

\* cited by examiner (a) antena port 0
(b) antena port 1
(c) antena port 2
(d) antena port 3

RECEIVER APPARATUS, RECEIVING METHOD, AND PROGRAM

TECHNICAL FIELD

The present invention relates to a receiver apparatus, a receiving method, and a program.

BACKGROUND ART

In a wireless communication system supposing a high-speed movement such as an LTE (long term evolution) system, receiving characteristics are ensured by enhancing the accuracy of channel estimation with use of pilot symbols. Furthermore, in this type of systems, transmission technology using a plurality of antennas, for example, transmission technology represented by MIMO (multiple input multiple output), is used in order to provide high-speed communication. Pilot symbols are assigned to each of the antennas.

Meanwhile, a method of obtaining an error in the time direction and an error in the frequency direction and comparing them with each other to select an interpolation method (hereinafter referred to as "determination of a direction of estimation of virtual generated values") has been known as one of channel estimation techniques. This method employs the following characteristics: When a movement speed is fast, an error of an interpolation in the time direction increases. When a delay dispersion is large, an error of an interpolation in the frequency direction increases.

Some conventional technologies include a propagation path transfer function estimator that estimates a transfer function matrix of a propagation path based upon a received signal and an interference remover-decoder that removes interference of the received signal and decodes transmission data based upon the received signal and the transfer function matrix (see, e.g., Patent Literature 1). In this case, the interference remover-decoder performs a decoding operation with a conjugate gradient method so as to decode transmission data based upon the received signal and the transfer function matrix.

PRIOR ART LITERATURE

Patent Literature 1: JP-A 2008-135823
Non-Patent Literature 1: 3GPP TS 36.211 V9.1.0

SUMMARY OF THE INVENTION

Problem(s) to be Solved by the Invention

However, when 4-antenna transmission is compared to 2-antenna transmission, operations for transmitting antennas TxAnt#2/#3 used only in the case of the 4-antenna transmission are needed upon determination of a direction of estimation of virtual generated values in addition to operations for transmitting antennas TxAnt#0/#1 used in the case of the 2-antenna transmission. Thus, the amount of calculation increases.

Thus, the present invention has been made in order to solve the above problem. Specifically, it is an object of the present invention to provide a receiver apparatus, a receiving method, and a program capable of reducing the amount of calculation.

Means to Solve the Problem

According to an aspect of the present invention, a receiver apparatus constituting a communication system using four transmitting antennas and two receiving antennas comprises determination means for determining whether or not, in a portion in which a different known pilot symbol is arranged with respect to each of the transmitting antennas, an error of a channel estimation value at the pilot symbol location in a frequency direction is smaller than an error in a time direction for predetermined two of the transmitting antennas, the channel estimation value being calculated by multiplying a received signal by the pilot symbol; first interpolation means for performing an interpolation in the frequency direction on the channel estimation value at the portion in which the pilot symbol is arranged to calculate a channel estimation value having a 3-subcarrier interval if the error in the frequency direction is determined to be smaller than the error in the time direction; and second interpolation means for performing an interpolation in the time direction on the channel estimation value at the portion in which the pilot symbol is arranged to calculate a channel estimation value having a 3-subcarrier interval if the error in the frequency direction is not determined to be smaller than the error in the time direction.

In addition to the above arrangement, the receiver apparatus according to the present invention further comprises channel estimation value calculation means for calculating the channel estimation value at the portion in which the pilot symbol is arranged by multiplying the received signal by the different known pilot symbol with respect to each of the transmitting antennas.

Moreover, in addition to the above arrangement, the receiver apparatus according to the present invention further includes third interpolation means for performing an interpolation in the frequency direction with the channel estimation value having a 3-subcarrier interval that has been calculated by the interpolation of the first interpolation means or the second interpolation means for thereby calculating channel estimation values for all of subcarriers; and fourth interpolation means for performing an interpolation in the time direction with the channel estimation value that has been calculated by the interpolation of the third interpolation for thereby calculating channel estimation values for all of symbols.

Furthermore, according to another aspect of the present invention, a receiving method of a receiver apparatus constituting a communication system using four transmitting antennas and two receiving antennas comprises a determination step of determining whether or not, in a portion in which a different known pilot symbol is arranged with respect to each of the transmitting antennas, an error of a channel estimation value at the pilot symbol location in a frequency direction is smaller than an error in a time direction for predetermined two of the transmitting antennas, the channel estimation value being calculated by multiplying a received signal by the pilot symbol; a first interpolation step of performing an interpolation in the frequency direction on the channel estimation value at the portion in which the pilot symbol is arranged to calculate a channel estimation value having a 3-subcarrier interval if the error in the frequency direction is determined to be smaller than the error in the time direction; and a second interpolation step of performing an interpolation in the time direction on the channel estimation value at the portion in which the pilot symbol is arranged to calculate a channel estimation value having a 3-subcarrier interval if the error in the frequency direction is not determined to be smaller than the error in the time direction.

Moreover, according to still another aspect of the present invention, a program according to the present invention is configured to perform a process with a computer of a receiver apparatus constituting a communication system using four transmitting antennas and two receiving antennas, the process comprising: a determination step of determining whether or not, in a portion in which a different known pilot symbol is arranged with respect to each of the transmitting antennas, an error of a channel estimation value at the pilot symbol location in a frequency direction is smaller than an error in a time direction for predetermined two of the transmitting antennas, the channel estimation value being calculated by multiplying a received signal by the pilot symbol; a first interpolation step of performing an interpolation in the frequency direction on the channel estimation value at the portion in which the pilot symbol is arranged to calculate a channel estimation value having a 3-subcarrier interval if the error in the frequency direction is determined to be smaller than the error in the time direction; and a second interpolation step of performing an interpolation in the time direction on the channel estimation value at the portion in which the pilot symbol is arranged to calculate a channel estimation value having a 3-subcarrier interval if the error in the frequency direction is not determined to be smaller than the error in the time direction.

According to an embodiment of the present invention, there can be provided a receiver apparatus, a receiving method, and a program capable of reducing the amount of calculation.

MODE(S) FOR CARRYING OUT THE INVENTION

Figure 6:
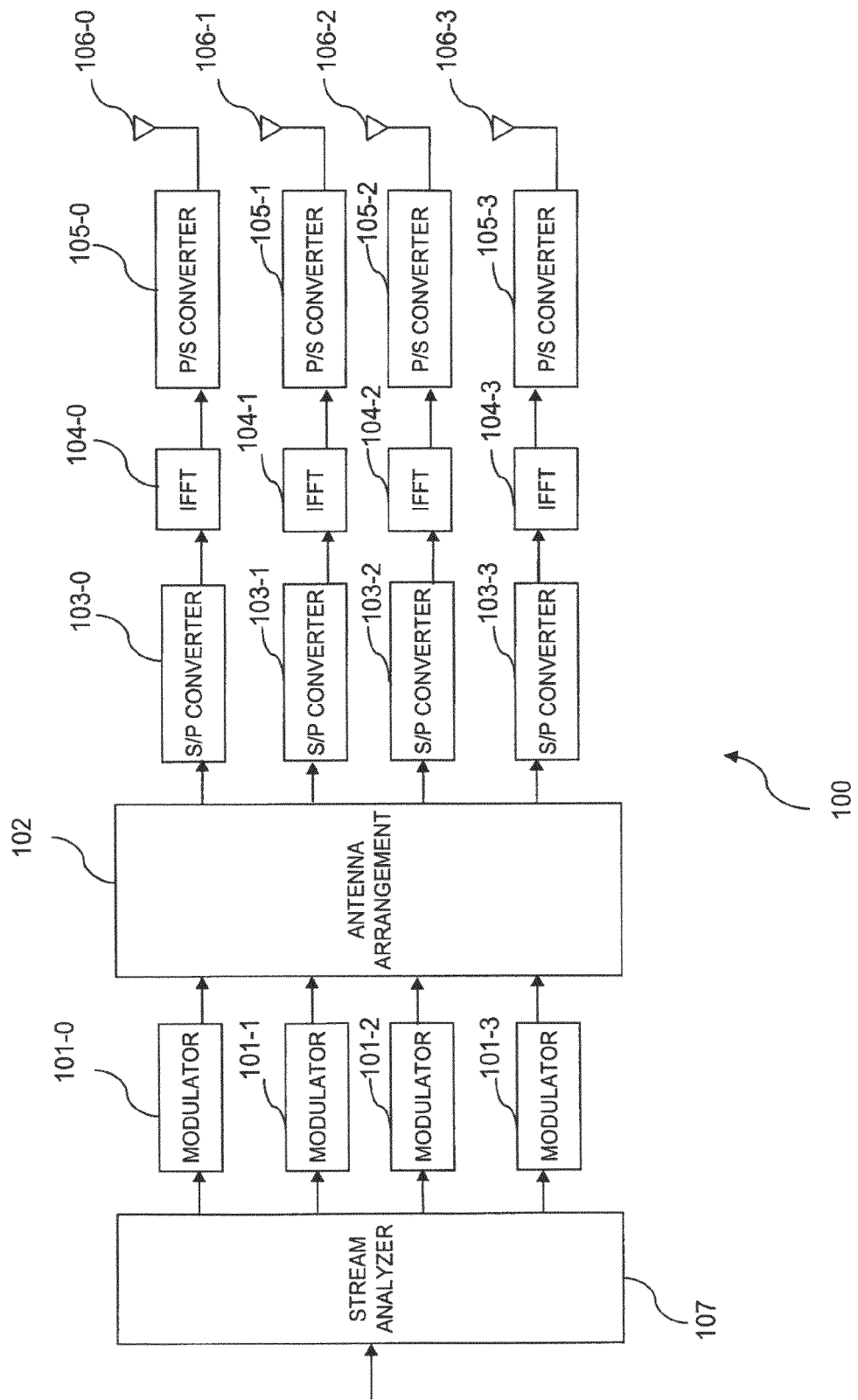
FIG. 6 is a schematic block diagram showing a general transmitter apparatus in an LTE system.

In an LTE system, OFDMA (orthogonal frequency division multiple access) is used in a down link. FIG. 6 is a schematic block diagram showing a transmitter apparatus in an access point (base station) of an LTE system. This figure uses FIG. 1 of Patent Literature 1. The transmitter apparatus 100 has four transmitting antennas and forms an MIMO system along with a receiver apparatus having two receiving antennas, which will be described later. The transmitter apparatus 100 includes a stream analyzer 107, modulators 101-0, 101-1, 101-2, and 101-3, an antenna arrangement 102, S/P converters 103-0, 103-1, 103-2, and 103-3, inverse fast Fourier transformers 104-0, 104-1, 104-2, and 104-3, P/S converters 105-0, 105-1, 105-2, and 105-3, and transmitting antennas 106-0, 106-1, 106-2, and 106-3.

Any desired data series to be transmitted is inputted to the stream analyzer 100. The stream analyzer 107 performs a space division multiplex on the inputted data series to produce four stream series. The respective multiplexed stream series are subjected to constellation mapping with a modulation method such as phase shift keying (PSK) or quadrature amplitude modulation (QAM) by the modulators 101-0, 101-1, . . . , 101-3.

The modulated signals are subjected to space-time coding (STC) in the antenna arrangement 102. In a case where only space multiplexing is conducted without space-time coding, the antenna arrangement 102 is omitted.

Next, the stream series of the modulated signals are subjected to a serial-parallel conversion into N series being in parallel to each other by the S/P converters 103-0, 103-1, . . . , 103-3. The N-parallel modulated signals that have been subjected to a serial-parallel conversion are subjected to an orthogonal frequency division multiplexing (OFDM) modulation by the IFFT 104-0, . . . , 104-3.

The N series of the OFDM-modulated signals are subjected to a parallel-serial conversion by the P/S converters 105-0, 105-1, . . . , 105-3 so that they are modulated from baseband signals into radio frequency signals, and then transmitted from the transmitting antennas 106-0, 106-1, . . . , 106-3.

Figure 7:
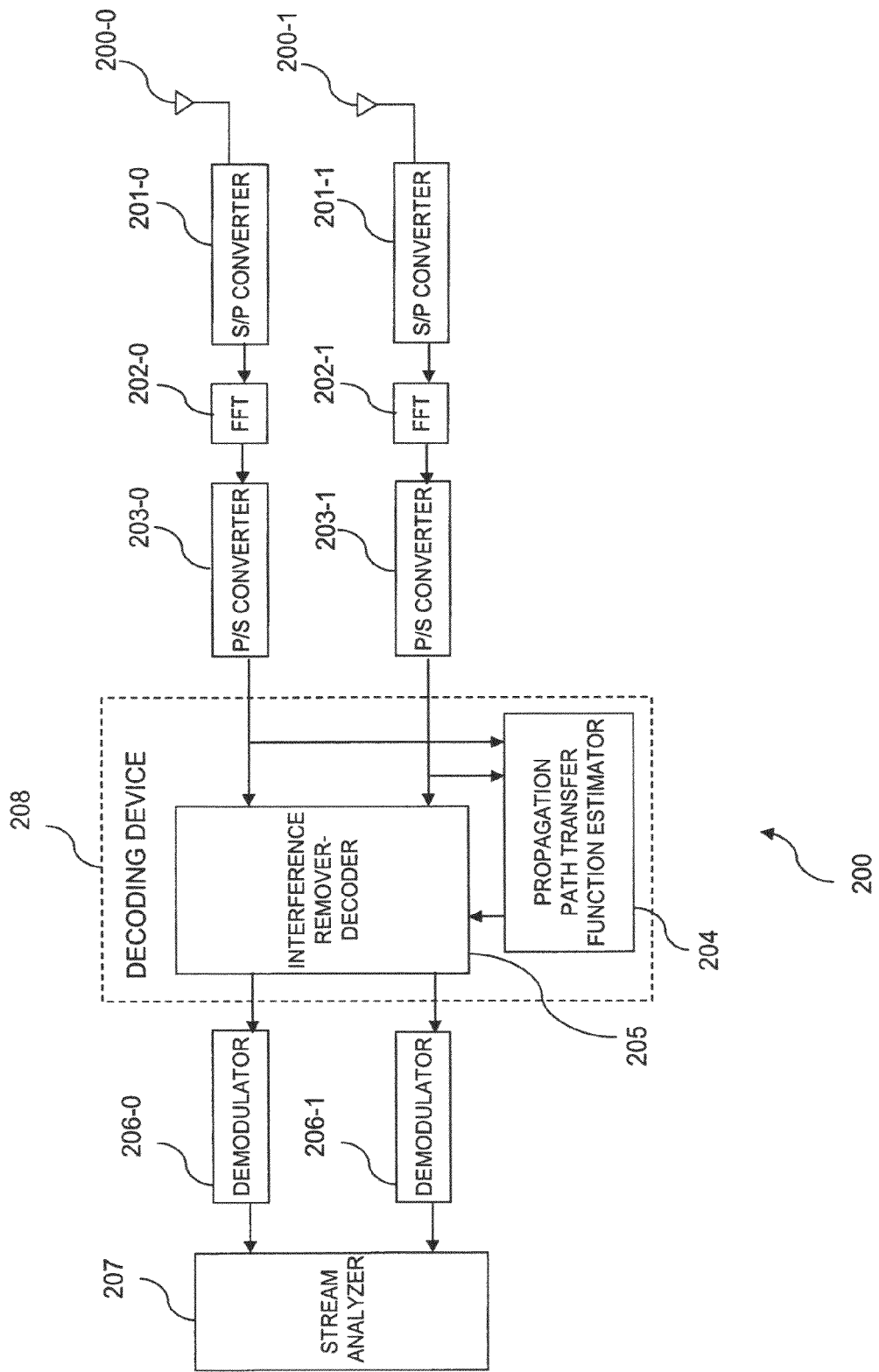
FIG. 7 is a schematic block diagram showing a receiver apparatus in an LTE terminal apparatus to which the present invention is applied.

FIG. 7 is a block diagram showing a receiver apparatus in an LTE terminal apparatus. This figure uses FIG. 2 of Patent Literature 1. The receiver apparatus 200 includes receiving antennas 200-0 and 200-1, S/P converters 201-0 and 201-1, fast Fourier transformers (FFTs) 202-0 and 202-1, P/S converters 203-0 and 203-1, a propagation path transfer function estimator 204, an interference remover-decoder 205, demodulators 206-0 and 206-1, and a stream analyzer 207. Here, the propagation path transfer function estimator (channel estimation processing portion) 204 and the interference remover-decoder 205 constitute a decoding device for decoding transmitted signals from received signals.

The radio frequency signals transmitted from the MIMO transmitter apparatus are received by the two receiving antennas 200-0 and 200-1. The radio frequency signal received by each of the receiving antennas has been subjected to distortion in amplitude and phase by ⚡ fading in propagation paths from transmitting antennas to the receiving antenna. Two series of radio frequency signals received by the receiving antennas 200-0 and 200-1 are demodulated into baseband signals, respectively.

Each of the demodulated signals is subjected to a serial-parallel conversion into N series by the S/P converters 201-0 and 201-1.

The respective N-parallel demodulated signals that have been subjected to a serial-parallel conversion are subjected to an OFDM demodulation by the FFTs 202-0 and 202-1.

The respective N-parallel signals that have been subjected to an OFDM demodulation are subjected to a parallel-serial conversion by the P/S converters 203-0 and 203-1. Thus, two series of serial signals that have been subjected to an OFDM demodulation are obtained. Those two series of serial signals are inputted into the propagation path transfer function estimator 204 and the interference remover-decoder 205.

The propagation path transfer function estimator 204 estimates a transfer function matrix H of a propagation path (hereinafter referred to as "channel estimation matrix") based upon the two series of signals that have been subjected to a parallel-serial conversion. Furthermore, the interference remover-decoder 205 decodes the transmitted data series based upon the two series of serial signals that have been subjected to an OFDM demodulation and the channel estimation matrix H.

The signals decoded by the interference remover-decoder 205 are subjected to PSK/QAM constellation demapping by the demodulators 206-0 and 206-1. Two series of space-multiplexed signals are decoded into original data series by the stream analyzer 207. The present invention has some features in the propagation path transfer function estimator 204 of the receiver apparatus shown in FIG. 7.

An embodiment of the present invention will be described below with reference to FIGS. 1 to 5.

Figure 1:
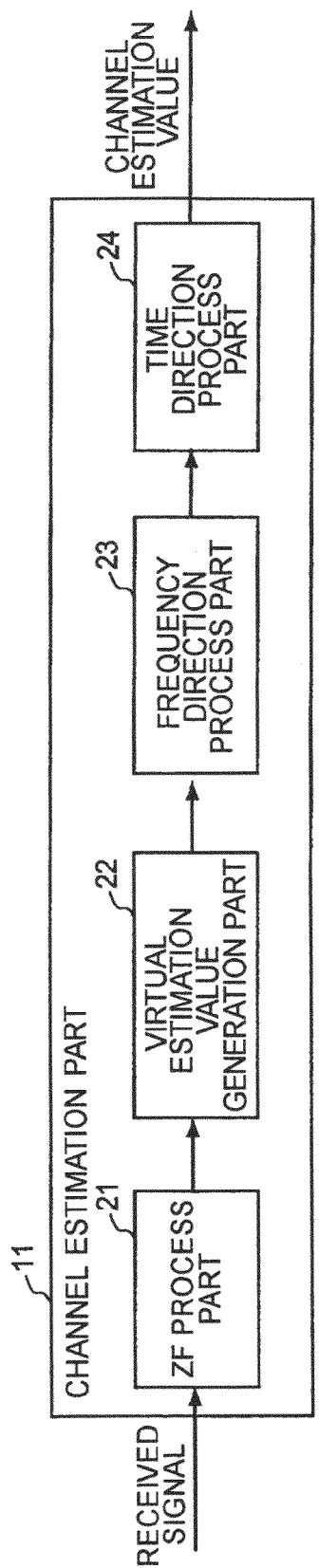
FIG. 1 is a block diagram showing an example of a configuration of a channel estimation part of an LTE terminal device according to an embodiment of the present invention.

FIG. 1 is a block diagram showing an example of a configuration of a channel estimation part 11 of an LTE terminal device according to an embodiment of the present invention. The channel estimation part 11 uses a characteristic that a movement speed exerts influence in common with all antennas. For calculation of an error in the time direction, the channel estimation part 11 determines a direction of estimation of virtual generated values with only pilot symbols of two antennas TxAnt#0/#1 used for 2-antenna transmission even in a case of 4-antenna transmission.

The channel estimation part 11 needs to process each of combinations of a receiving antenna (RxAnt#a) (a is 0 or 1 in a case of two receiving antennas) and a transmitting antenna (TxAnt#b) (b is 0, 1, 2, or 3 in a case of four transmitting antennas). Therefore, in an example of two receiving antennas and four transmitting antennas, eight channel estimation parts 11 are required. Specifically, a received signal from a predetermined receiving antenna (RxAnt#a) is inputted to the channel estimation part 11.

The channel estimation part 11 has a ZF process part 21, a virtual estimation value generation part 22, a frequency direction process part 23, and a time direction process part 24.

The ZF (Zero Forcing) process part 21 multiplies a received signal from a certain receiving antenna (RxAnt#a) by a known pilot symbol that is different from one transmitting antenna (TxAnt#b) to another. This pilot symbol is a pilot signal transmitted from each of the transmitting antennas (TxAnt#b) and is a predetermined one. This multiplication provides a difference (noise) produced at some point in a propagation path by the time when a transmitted signal is received. Specifically, a channel estimation value (hereinafter referred to as a ZF output signal) at a portion where the pilot symbol is arranged is calculated by this process. The pilot symbol is arranged as a pattern on a radio resource with a size of a system band width in a direction of the frequency axis and one time slot in a direction of the time axis. Other types of signals, primarily, user data and control signals, are arranged on this radio resource in addition to the pilot symbol. More specifically, FIGS. 8(*a*) to 8(*d*) illustrate pilot symbol patterns on two radio resource blocks with a border of a thick vertical line. Those patterns are patterns of pilot symbols of four transmitting antenna ports. Pilot symbols are arranged on a frequency (carrier)-time matrix where the frequency (subcarrier) is defined in the y-axis whereas the time (symbol) is defined in the x-axis. The ZF process part 21 supplies a ZF output signal to the virtual estimation value generation part 22.

Figure 8:
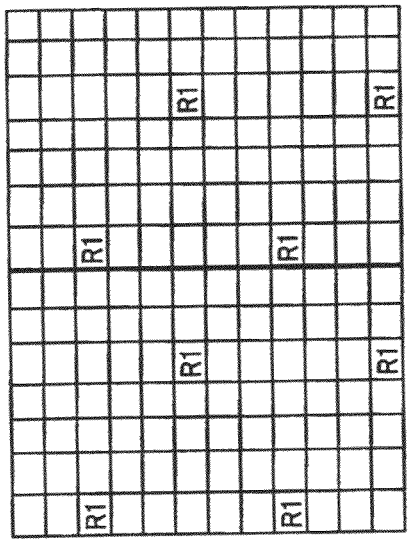
FIGS. 8($a$) to 8($d$) are diagrams showing an arrangement pattern of pilot symbols.
Figure 8:
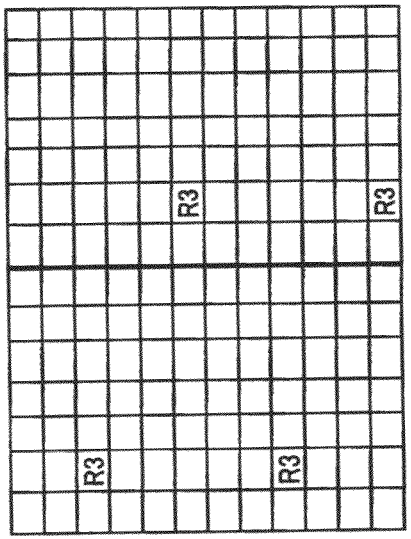
Figure 8:
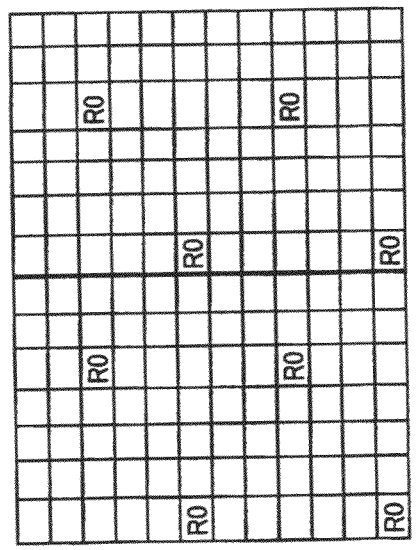
Figure 8:
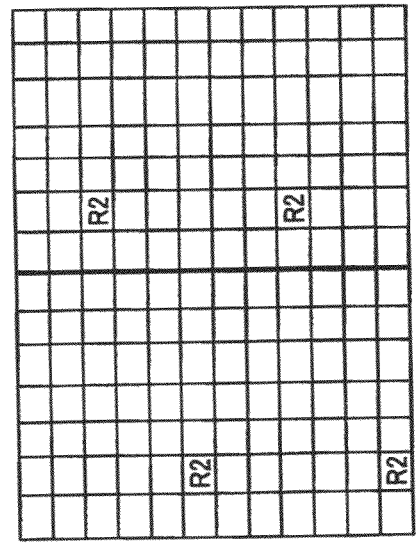

The virtual estimation value generation part 22 calculates a channel estimation value having a 3-subcarrier interval for the ZF output signal (hereinafter referred to as a virtual estimation value). The pilot symbols are arranged at intervals of 6 subcarriers. The first pilot symbol and the second pilot symbol are shifted by 3 subcarriers. Specifically, as shown in FIGS. 8(*a*) and 8(*b*), the pilot symbol located at the first position in the seven symbols within the time slot is the first pilot symbol. The pilot symbol located at the fifth position is the second pilot symbol. Therefore, the pilot symbols are present substantially at intervals of 3 subcarriers.

Furthermore, as shown in antenna port 2 and antenna port 3 of FIGS. 8(*c*) and 8(*d*), pilot symbols of signals transmitted from TxAnt#2/#3 used only in the case of 4-antenna transmission have a density in the time direction that is lower than those of pilot symbols of signals transmitted from TxAnt#0/#1 used in the case of 2-antenna transmission. This can be understood well if FIGS. 8(*c*) and 8(*d*) are compared to the arrangement of pilot symbols in antenna port 2 and antenna port 3 of FIGS. 8(*a*) and 8(*b*), which are pilot symbol patterns of signals transmitted from TxAnt#0/#1.

Figure 2:
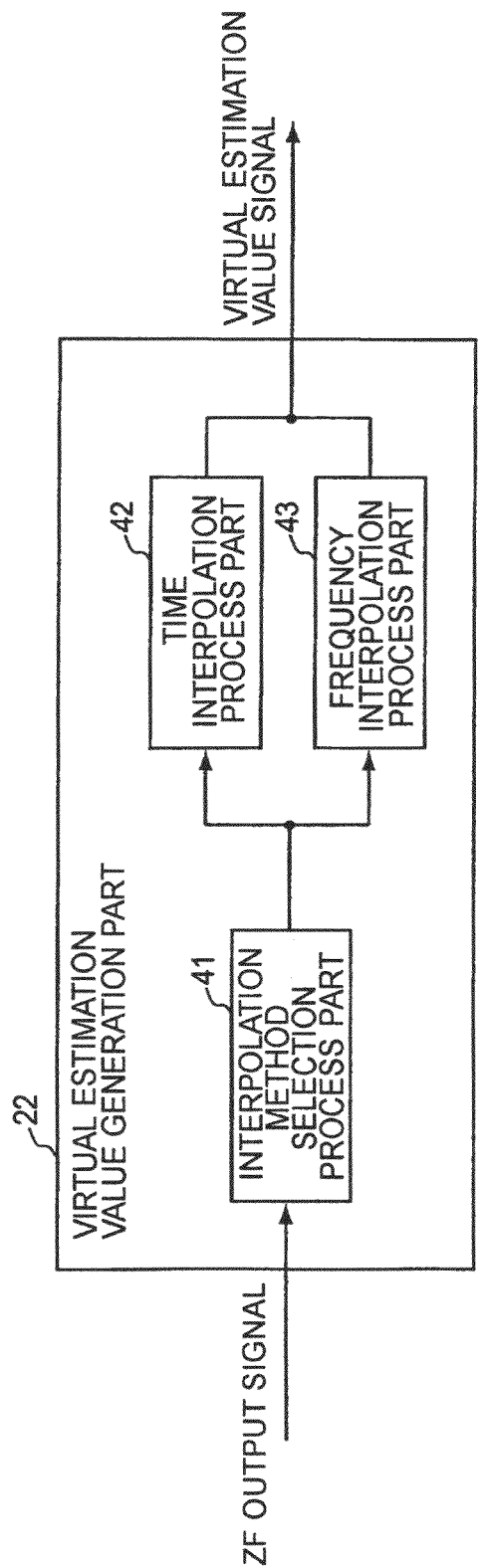
FIG. 2 is a block diagram showing an example of a configuration of a virtual estimation value generation part 22.

FIG. 2 is a block diagram showing an example of a configuration of the virtual estimation value generation part 22. The virtual estimation value generation part 22 has an interpolation method selection process part 41, a time interpolation process part 42, and a frequency interpolation process part 43.

The interpolation method selection process part 41 calculates an error in the frequency direction and an error in the time direction for the ZF output signals supplied from the ZF process part 21 with respect to the transmitted signals. Conventionally, operations have been performed on the four transmitting antennas (TxAnt#0/#1/#2/#3) when an error in the time direction is calculated. The interpolation method selection process part 41 performs an operation only on the two transmitting antennas (TxAnt#0/#1) used in the case of 2-antenna transmission. Specifically, in the present embodiment, only the pilot symbols in the arrangements of antenna port 0 and antenna port 1 of FIGS. 8(*a*) and 8(*b*) are subjected to the operation.

The interpolation method selection process part 41 determines whether or not the error in the frequency direction is smaller than the error in the time direction.

When the error in the frequency direction is not smaller than the error in the time direction, the interpolation method selection process part 41 supplies the ZF output signal to the time interpolation process part 42. When the error in the frequency direction is smaller than the error in the time direction, the interpolation method selection process part 41 supplies the ZF output signal to the frequency interpolation process part 43. The time interpolation process part 42 calculates and outputs a virtual estimation value with use of a time interpolation process performed on the ZF output signal supplied from the interpolation method selection process part 41. The frequency interpolation process part 43 calculates and outputs a virtual estimation value with use of a frequency interpolation process performed on the ZF output signal supplied from the interpolation method selection process part 41.

The virtual estimation value generation part 22 supplies a channel estimation value having a 3-subcarrier interval to the frequency direction process part 23.

The frequency direction process part 23 performs a frequency interpolation process on the virtual estimation value to calculate channel estimation values for all of the subcarriers. The frequency direction process part 23 supplies the channel estimation values for all of the subcarriers to the time direction process part 24. The time direction process part 24 performs a time interpolation process on the output of the frequency direction process part 23 to calculate channel estimation values for all of the symbols in the time direction. The time direction process part 24 outputs the channel estimation values for all of the symbols.

In the channel estimation part 11, the amount of calculation for channel estimation is reduced at the time of 4-antenna transmission of an LTE wireless communication system by reducing the number of antennas subjected to channel estimation operations. Specifically, the channel estimation part 11 employs the following two characteristics: A first characteristic is that a movement speed exerts influence in common with all antennas. A second characteristic is that pilot symbols in signals of TxAnt#2/#3 used only in the case of 4-antenna transmission have a density in the time direction that is lower than those of pilot symbols in signals of TxAnt#0/#1 used in the case of 2-antenna transmission. Thus, when an error in the time direction is calculated, only the pilot symbols of TxAnt#0/#1 are used even in the case of 4-antenna transmission to determine a direction of estimation of virtual generated values. Therefore, the amount of calculation is reduced as compared to conventional methods.

Figure 3:
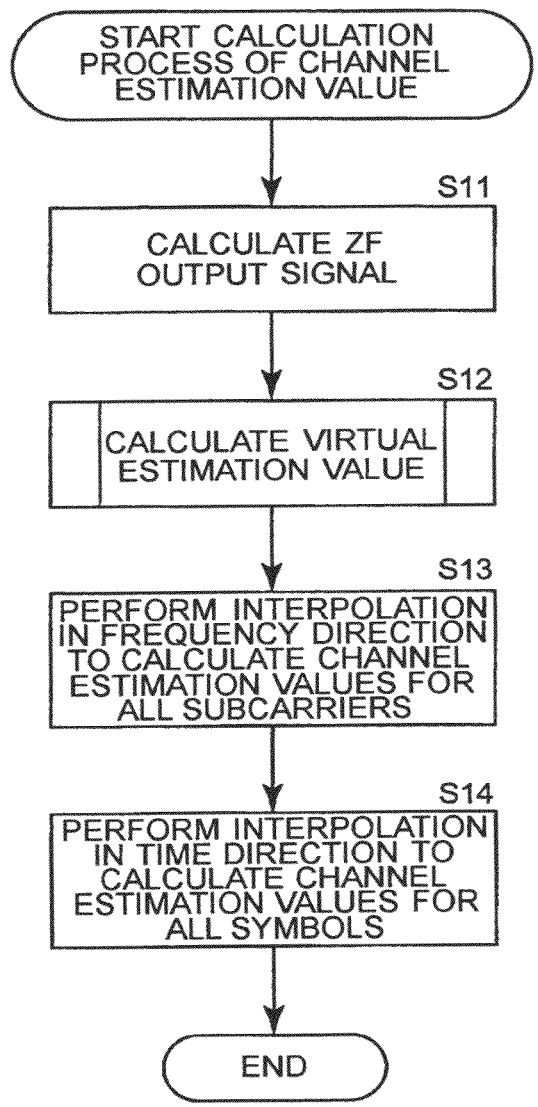
FIG. 3 is a flow chart explanatory of a calculation process of a channel estimation value.

FIG. 3 is a flow chart explanatory of a calculation process of a channel estimation value. In Step S11, the ZF process part 21 multiplies a received signal from a certain receiving antenna (RxAnt#a) by a known pilot symbol that is different from one transmitting antenna (TxAnt#b) to another. Thus, the ZF process part 21 calculates a ZF output signal, which is a channel estimation value for the part where the pilot symbol is arranged. In Step S12, the virtual estimation value generation part 22 performs a virtual estimation value calculation process of calculating a channel estimation value having a 3-subcarrier interval from the ZF output signal.

Figure 4:
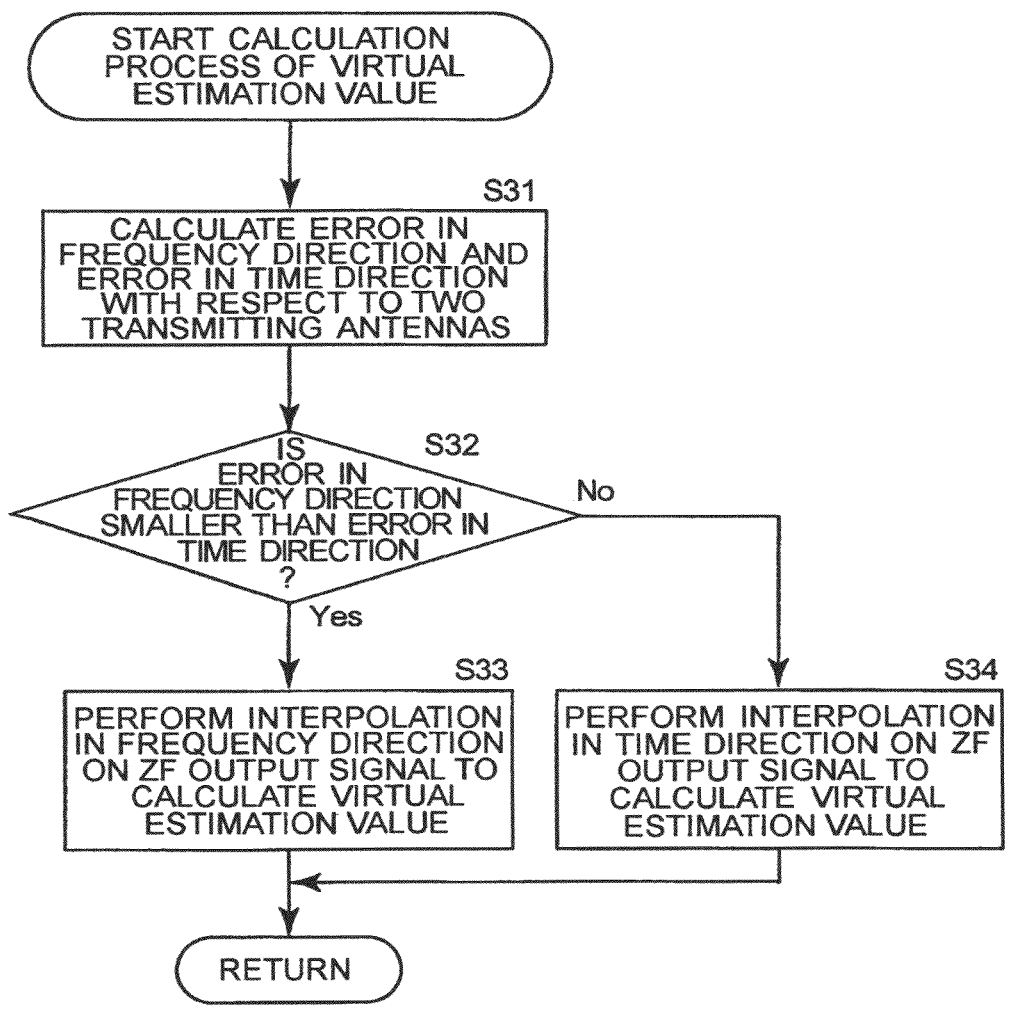
FIG. 4 is a flow chart explanatory of a calculation process of a virtual estimation value.

FIG. 4 is a flow chart explanatory of the details of a calculation process of a virtual estimation value. In Step S31, the interpolation method selection process part 41 calculates, from the ZF output signal supplied from the ZF process part 21, an error in the frequency direction with respect to the transmitted signal and an error in the time direction with respect to the two transmitting antennas (TxAnt#0/#1) used in the case of 2-antenna transmission. In Step S32, the interpolation method selection process part 41 determines whether or not the error in the frequency direction is smaller than the error in the time direction with respect to the two transmitting antennas (TxAnt#0/#1) used in the case of 2-antenna transmission.

If the error in the frequency direction is determined in Step S32 to be smaller than the error in the time direction with respect to the two transmitting antennas (TxAnt#0/#1), then the process proceeds to Step S33. The interpolation method selection process part 41 supplies the ZF output signal to the frequency interpolation process part 43, which performs an interpolation in the frequency direction on the ZF output signal to calculate a virtual estimation value. The process returns to the calculation process of a channel estimation value.

Meanwhile, if the error in the frequency direction is not determined in Step S32 to be smaller than the error in the time direction with respect to the two transmitting antennas (TxAnt#0/#1), then the process proceeds to Step S34. The interpolation method selection process part 41 supplies the ZF output signal to the time interpolation process part 42, which performs an interpolation in the time direction on the ZF output signal to calculate a virtual estimation value. The process returns to the calculation process of a channel estimation value.

Referring back to FIG. 3, in Step S13, the frequency direction process part 23 performs an interpolation in the frequency direction on the virtual estimation value to calculate channel estimation values for all of the subcarriers. In Step S14, the time direction process part 24 performs an interpolation in the time direction on an output of the frequency direction process part 23 to calculate channel estimation values for all of the symbols. Then the calculation process of a channel estimation value is completed.

Thus, for calculating an error in the time direction, with use of the characteristic that a movement speed exerts influence in common with all antennas, only pilot symbols of TxAnt#0/#1 are used even in the case of 4-antenna transmission to determine a direction of estimation of virtual generated values.

First, since only two transmitting antennas are considered for calculation of an error in the time direction even in the case of 4-antenna transmission, the amount of calculation can be reduced as compared to conventional methods. Second, since only two transmitting antennas are considered for calculation of an error in the time direction even in the case of 4-antenna transmission, electric power consumption can be reduced as compared to conventional methods.

Third, since only two transmitting antennas are considered for calculation of an error in the time direction even in the case of 4-antenna transmission, the apparatus can be made smaller in size as compared to conventional methods.

In the above embodiment, only two of four antennas are used. The present invention is not limited to this example although a fundamental configuration of the present invention is as described above. While all of four antennas are used, for example, a weighing process with a level of a received signal or the like may be performed.

Furthermore, in the above embodiment, an LTE wireless communication system has been described. However, similar techniques may be applied to wireless communication systems such as a cellular phone using MIMO-OFDM (orthogonal frequency division multiplexing)/FDM (frequency division multiplexing), PHS (personal handy-phone system), and wireless LAN (local area network).

The aforementioned sequence of processes may be implemented with hardware or implemented with software. When the sequence of processes are implemented with software, a program constituting the software is installed from a program recording medium into a computer incorporated into dedicated hardware or, for example, a general personal computer capable of performing various functions by installing a variety of programs.

Figure 5:
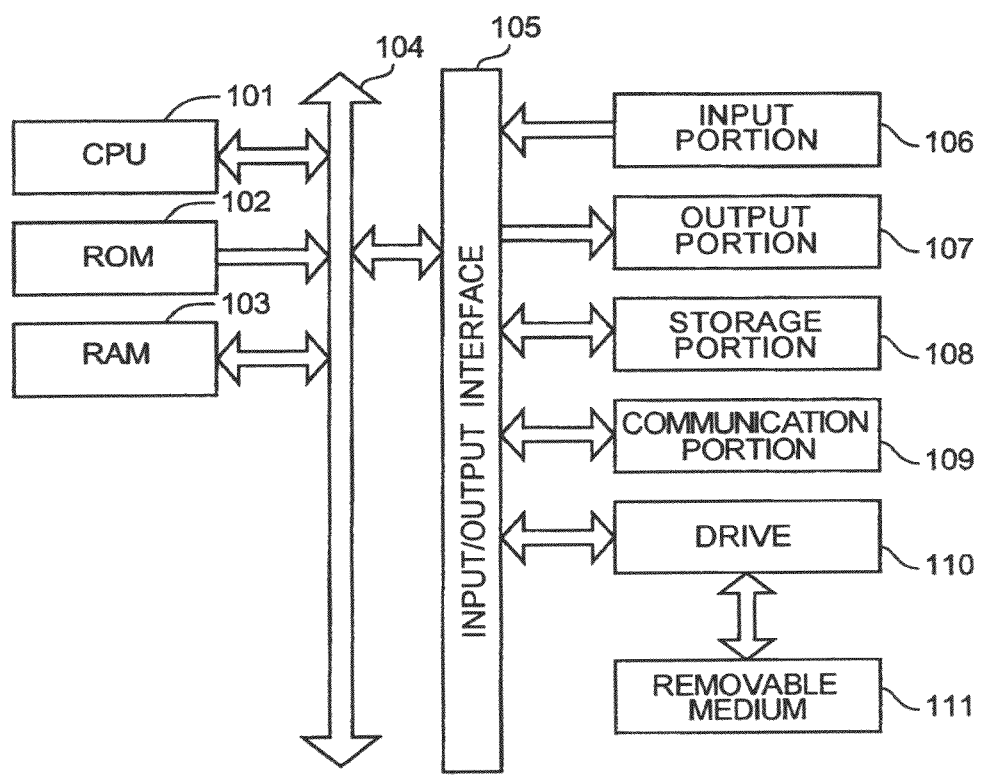
FIG. 5 is a block diagram showing a configuration example of hardware of a computer that performs the calculation process of a channel estimation value by a program.

FIG. 5 is a block diagram showing a configuration example of hardware of a computer that performs the aforementioned sequence of processes by a program.

In the computer, a CPU (Central Processing Unit) 101, a ROM (Read Only Memory) 102, and a RAM (Random Access Memory) 103 are connected to each other via a bus 104.

The bus 104 is further connected to an input/output interface 105. The input/output interface 105 is connected to an input portion 106 including a keyboard, a mouse, a microphone, and the like, an output portion 107 including a display, a speaker, and the like, a storage portion 108 including a hard disk, a nonvolatile memory, and the like, a communication portion 109 including a network interface and the like, and a drive 110, which operates a removable medium 111 such as a magnetic disk, an optical disk, a magneto-optical disk, or a semiconductor memory.

In the computer thus configured, the CPU 101 loads a program stored in the storage portion 108, for example, into the RAM 103 via the input/output interface 105 and the bus 104 and executes it for thereby performing the aforementioned series of processes.

For example, the program executed by the computer (CPU 101) is recorded and provided on the removable medium 111, which is a package medium of a magnetic disk (including a flexible disk), an optical disk (CD-ROM (Compact Disc-Read Only Memory), DVD (Digital Versatile Disc), or the like), a magneto-optical disk, a semiconductor memory, or the like. Alternatively, the program executed by the computer (CPU 101) is provided via a wired or wireless transmission medium such as a local area network, the Internet, or digital satellite broadcasting.

When the removable medium 111 is mounted on the drive 110, the program is stored into the storage portion 108 via the input/output interface 105. Thus, the program can be installed on the computer. Alternatively, the program is received via the wired or wireless transmission medium by the communication portion 109 and stored into the storage portion 108. Thus, the program can be installed on the computer. In another case, the program is prestored in the ROM 102 or the storage portion 108 and can thus be installed on the computer.

The program executed by the computer may perform processes sequentially in the order described in the specification or may perform processes in parallel or at necessary timing, for example, when it is called.

Furthermore, the present invention is not limited to the aforementioned embodiment. Various modifications can be made therein without departing from the spirit of the present invention.

All or part of the above embodiments can be described as in the following notes. Nevertheless, the present invention is not limited to those notes.

(Note 1) A receiver apparatus for a communication system using four transmitting antennas and two receiving antennas, characterized by comprising: determination means for determining whether or not, in a pilot pattern in which a pilot symbol is arranged at a different location in a frequency-time matrix with respect to each of the transmitting antennas, an error of a channel estimation value at the pilot symbol location in a frequency direction is smaller than an error in a time direction for predetermined two of the transmitting antennas, the channel estimation value being calculated by multiplying a received signal by a certain signal indicative of the pilot symbol; first interpolation means for performing an interpolation in the frequency direction on the channel estimation value at the pilot symbol location to calculate a channel estimation value having a 3-subcarrier interval if the error in the frequency direction is determined to be smaller than the error in the time direction; and second interpolation means for performing an interpolation in the time direction on the channel estimation value at the pilot symbol location to calculate a channel estimation value having a 3-subcarrier interval if the error in the frequency direction is not determined to be smaller than the error in the time direction.

(Note 2) The receiver apparatus as recited in Note 1, further comprising channel estimation value calculation means for calculating the channel estimation value at the pilot symbol location by multiplying the received signal by the pilot symbol at the pilot symbol location in the pilot pattern in which the pilot symbol is arranged at a different location in the frequency-time matrix with respect to each of the transmitting antennas.

(Note 3) The receiver apparatus as recited in Note 1, further comprising: third interpolation means for performing an interpolation in the frequency direction with the channel estimation value having a 3-subcarrier interval that has been calculated by the interpolation of the first interpolation means or the second interpolation means for thereby calculating channel estimation values for all of subcarriers; and fourth interpolation means for performing an interpolation in the time direction with the channel estimation value that has been calculated by the interpolation of the third interpolation for thereby calculating channel estimation values for all of symbols.

(Note 4) A receiving method of a receiver apparatus for a communication system using four transmitting antennas and two receiving antennas, characterized by comprising: a determination step of determining whether or not, in a pilot pattern in which a pilot symbol is arranged at a different location in a frequency-time matrix with respect to each of the transmitting antennas, an error of a channel estimation value at the pilot symbol location in a frequency direction is smaller than an error in a time direction for predetermined two of the transmitting antennas, the channel estimation value being calculated by multiplying a received signal by a certain signal indicative of the pilot symbol; a first interpolation step of performing an interpolation in the frequency direction on the channel estimation value at the pilot symbol location to calculate a channel estimation value having a 3-subcarrier interval if the error in the frequency direction is determined to be smaller than the error in the time direction; and a second interpolation step of performing an interpolation in the time direction on the channel estimation value at the pilot symbol location to calculate a channel estimation value having a 3-subcarrier interval if the error in the frequency direction is not determined to be smaller than the error in the time direction.

(Note 5) The receiving method as recited in Note 4, characterized by comprising: a step of calculating the channel estimation value at the pilot symbol location by multiplying the received signal by the pilot symbol at the pilot symbol location in the pilot pattern in which the pilot symbol is arranged at a different location in the frequency-time matrix with respect to each of the transmitting antennas.

(Note 6) A program for performing a process with a computer of a receiver apparatus for a communication system using four transmitting antennas and two receiving antennas, the process including: a determination step of determining whether or not, in a pilot pattern in which a pilot symbol is arranged at a different location in a frequency-time matrix, an error of a channel estimation value at the pilot symbol location in a frequency direction is smaller than an error in a time direction for predetermined two of the transmitting antennas, the channel estimation value being calculated by multiplying a received signal by a certain signal indicative of the pilot symbol; a first interpolation step of performing an interpolation in the frequency direction on the channel estimation value at the pilot symbol location to calculate a channel estimation value having a 3-subcarrier interval if the error in the frequency direction is determined to be smaller than the error in the time direction; and a second interpolation step of performing an interpolation in the time direction on the channel estimation value at the pilot symbol location to calculate a channel estimation value having a 3-subcarrier interval if the error in the frequency direction is not determined to be smaller than the error in the time direction.

This application claims the benefit of priority from Japanese patent application No. 2009-264256, filed on Nov. 19, 2009, the disclosure of which is incorporated herein in its entirety by reference.

The invention claimed is:

1. A receiver apparatus for a communication system using four transmitting antennas and two receiving antennas, comprising a processor configured to:
determine whether or not, in a pilot pattern in which a pilot symbol is arranged at a different location in a frequency-time matrix with respect to each of the transmitting antennas, an error of a channel estimation value at the pilot symbol location in a frequency direction is smaller than an error in a time direction for predetermined two of the transmitting antennas, the channel estimation value being calculated by multiplying a received signal by the pilot symbol;
perform an interpolation in the frequency direction on the channel estimation value at the pilot symbol location to calculate a channel estimation value having a 3-subcarrier interval if the error in the frequency direction is determined to be smaller than the error in the time direction; and perform an interpolation in the time direction on the channel estimation value at the pilot symbol location to calculate a channel estimation value having a 3-subcarrier interval if the error in the frequency direction is not determined to be smaller than the error in the time direction.

2. The receiver apparatus as recited in claim 1, the processor further comprising:

calculate the channel estimation value at the pilot symbol location by multiplying the received signal by the pilot symbol at the pilot symbol location in the pilot pattern in which the pilot symbol is arranged at a different location in the frequency-time matrix with respect to each of the transmitting antennas.

3. The receiver apparatus as recited in claim 1, the processor further comprising:

perform an interpolation in the frequency direction with the channel estimation value having a 3-subcarrier interval that has been calculated by the interpolation of the first interpolation means or the second interpolation means for thereby calculating channel estimation values for all of subcarriers; and perform an interpolation in the time direction with the channel estimation value that has been calculated by the interpolation of the third interpolation for thereby calculating channel estimation values for all of symbols.

4. A receiving method of a receiver apparatus for a communication system using four transmitting antennas and two receiving antennas, the method comprising:

a determination step of determining whether or not, in a pilot pattern in which a pilot symbol is arranged at a different location in a frequency-time matrix with respect to each of the transmitting antennas, an error of a channel estimation value at the pilot symbol location in a frequency direction is smaller than an error in a time direction for predetermined two of the transmitting antennas, the channel estimation value being calculated by multiplying a received signal by the pilot symbol;

a first interpolation step of performing an interpolation in the frequency direction on the channel estimation value at the pilot symbol location to calculate a channel estimation value having a 3-subcarrier interval if the error in the frequency direction is determined to be smaller than the error in the time direction; and a second interpolation step of performing an interpolation in the time direction on the channel estimation value at the pilot symbol location to calculate a channel estimation value having a 3-subcarrier interval if the error in the frequency direction is not determined to be smaller than the error in the time direction.

5. The receiving method as recited in claim 4 comprising:

a step of calculating the channel estimation value at the pilot symbol location by multiplying the received signal by the pilot symbol at the pilot symbol location in the pilot pattern in which the pilot symbol is arranged at a different location in the frequency-time matrix with respect to each of the transmitting antennas.

6. A non-transitory computer program readable medium comprising computer implementable instructions causing a programmable computer of a receiver apparatus for a communication system using four transmitting antennas and two receiving antennas, the process comprising:

a determination step of determining whether or not, in a pilot pattern in which a pilot symbol is arranged at a different location in a frequency-time matrix, an error of a channel estimation value at the pilot symbol location in a frequency direction is smaller than an error in a time direction for predetermined two of the transmitting antennas, the channel estimation value being calculated by multiplying a received signal by the pilot symbol;

a first interpolation step of performing an interpolation in the frequency direction on the channel estimation value at the pilot symbol location to calculate a channel estimation value having a 3-subcarrier interval if the error in the frequency direction is determined to be smaller than the error in the time direction; and a second interpolation step of performing an interpolation in the time direction on the channel estimation value at the pilot symbol location to calculate a channel estimation value having a 3-subcarrier interval if the error in the frequency direction is not determined to be smaller than the error in the time direction.

* * * * *